(No Model.)
W. D. RUDY.
BUCKET BAIL.
No. 540,004. Patented May 28, 1895.
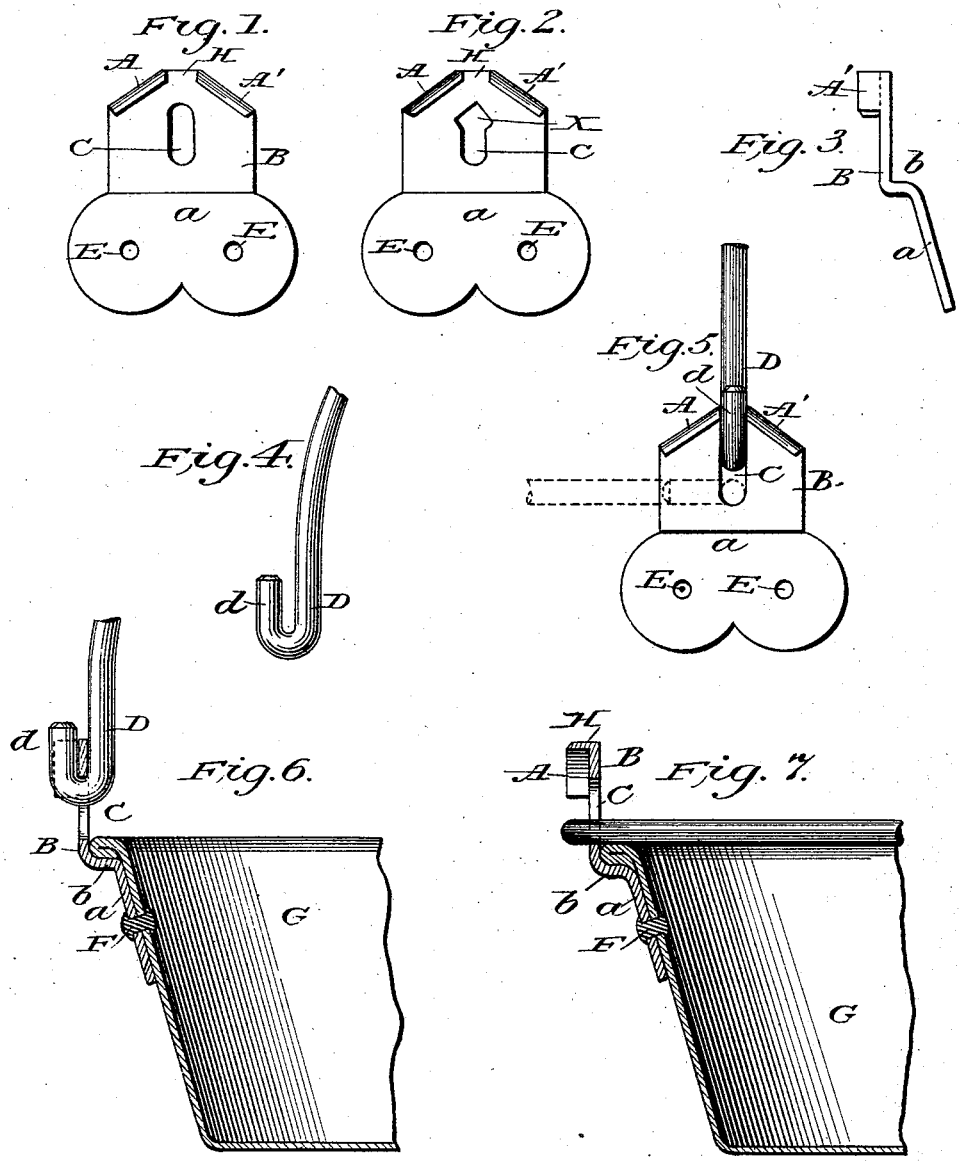
Witnesses.
Chas. G. Maize,
A. Lincoln Demlitz
Inventor.
Wm. D. Rudy.

UNITED STATES PATENT OFFICE.

WILLIAM DANIEL RUDY, OF LOUISVILLE, KENTUCKY.

BUCKET-BAIL.

SPECIFICATION forming part of Letters Patent No. 540,004, dated May 23, 1895.

Application filed February 16, 1895. Serial No. 538,723. (No model.)

*To all whom it may concern:*

Be it known that I, WILLIAM DANIEL RUDY, a citizen of the United States, residing at Louisville, in the county of Jefferson and State of Kentucky, have invented a new and useful Improvement in Bucket-Bails, of which the following is a specification.

My invention relates to the bail, or semicircular handle by which sauce pans, tin buckets, kettles, or like vessels are taken up and carried. The object is that while the bail is to lie horizontally on the rim of the vessel, when it is at rest, as such a bail must, in order to allow of a lid being put over it, it shall, nevertheless, when pulled up vertically, in lifting the vessel, keep the latter rigidly in a horizontal position, without tilting, and thus without spilling the contents. I call it a self-locking bucket bail. I obtain this result by the mechanism shown in the accompanying drawings, in which—

Figure 1 is a front elevation of the lug on each side of the vessel. Fig. 2 is a like elevation thereof in a modified form. Fig. 3 is a side elevation in the ordinary case of a vessel with a rim. Fig. 4 represents the lower end of the rod used for the bail. Fig. 5 shows the lug in front elevation, with the end of the bail in one position in strong lines and shaded, in the other position in the dotted lines. Fig. 6 shows half of the vessel with lug and great part of the bail on one side while hanging; Fig. 7, the same while at rest. Both of them show a side elevation as compared with Figs. 1, 2, and 5.

The same letters in each figure denote the same parts.

In Fig. 1, the lower part, $a$, represents so much of the lug as is attached to the side of the vessel. B is the upper, or protruding, part. C, is a slot cut through this part. The lug tapers to its top edge, H, barely wider than the thickness of the bail rod. A, A', are lips or flanges, bent at right angles to the plane of the lug, preferably to the outside. E, E, are rivet holes, by which to fasten the lug to the side of the vessel.

Fig. 2 is a like elevation to Fig. 1, except that the slot is widened at its top, after the manner of keyholes. The enlargement is preferably diamond shaped. It is marked by the letter X.

In Fig. 3 there is a bent part, $b$, to lie close to the rim of the vessel, which bent part would be left off when the vessel has no such rim. Here the best proportion of the lip or flange, A', to the lug is shown.

Fig. 4 shows that the lower end of the bail has an end, bent upward, parallel to the main part. This end ought to be longer than the slot C. Seen in Fig. 1.

In Fig. 5, D shows the actual position of the lower end of the bail, when the vessel is suspended, in dark and shaded lines; D', the position at rest, in dotted lines. When the vessel is suspended the small end $d$ projects above the space H.

In Fig. 6, G indicates the body of the vessel, and F, the rivet fastening lug to its side. Here the upper end of the lug, above the slot and between the tops of the lips, is inclosed between the main part and the end of the bail.

In Fig. 7, the right hand of the bail, D, is seen to be on or over the rim of the vessel, as it does when the vessel is at rest.

The operation of my contrivance is this: When the vessel is at rest the bend at the foot of the bail is at the bottom of the slot C, as shown in Fig. 5. When the vessel is raised up by the bail the upturned end has just play room along the lip A or A', which serves as a guide to it. When this turned up end passes the lip and comes to the free space H between lip A and lip A', the vessel, by its own weight slips down, so as to bring the bend in the bail to the top of the slot. The upturned end of the bail rod is then held at two points, the top of the slot and the space, H, between the converging lips; and stands rigidly at right angles to the plane of the vessel, and that plane is kept on a level. When the vessel is set down the bail naturally turns to one or the other side, and when it falls to a level, returns to the position shown in Figs. 5 and 7.

What I claim as my invention, and desire to secure by Letters Patent, is—

1. In a contrivance for lifting and holding a hollow vessel, in combination a bail rod, D, bent at each foot upward into a short end, $d$ parallel to that foot, and a lug attached to each side of the vessel, the protruding part, B, of each lug having, to receive the rod at its bend, a vertical slot, C, in the middle, somewhat shorter than the upturned end, $d$, such lug tapering from above the level of the base of the slot, upward, with lips, A, A', at right angles to the plane of the lug, at such a distance that the short end can revolve within them, and approaching so near together at the top of the lug, H, as to hold the upturned end between them, when it slips up by the weight of the vessel; substantially as described and drawn above, and for the purpose of bringing the vessel when held up, rigidly at right angles to its bail.

2. In a contrivance for lifting and holding a hollow vessel, in combination a bail rod, D, bent at each foot upward into a short end, $d$, parallel to that foot, and a lug attached to each side of the vessel, the protruding part, B, of each lug having, to receive the rod at its bend, a vertical slot, enlarged at its top into a diamond or circle, and shorter than the upturned end, $d$, such lug tapering from above the level of the base of the slot, upward with lips A, A', at right angles to the plane of the lug, at such a distance that the short end can revolve within them, and approaching so near together at top of the lug, H, as to hold the upturned end between them, when it slips up by the weight of the vessel, substantially as described and drawn above, and for the purpose of bringing the vessel when held up, rigidly at right angles to the bail.

WILLIAM DANIEL RUDY.

Witnesses:
THEODORE EITEL,
A. LINCOLN DEMBITZ.